Feb. 25, 1941.  C. R. PATON  2,233,222
MOTOR VEHICLE ANTENNA
Filed Nov. 23, 1936  4 Sheets-Sheet 1
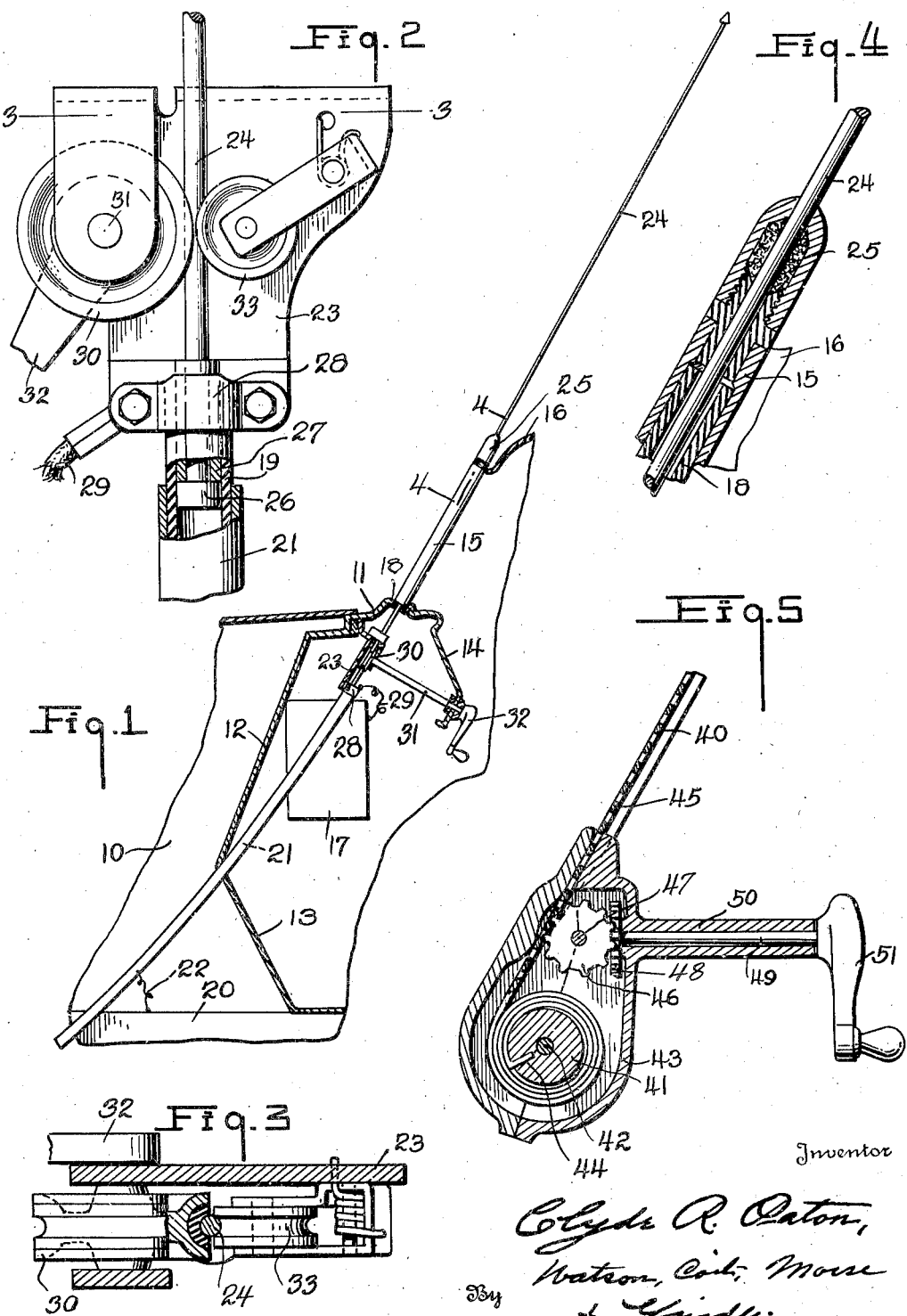

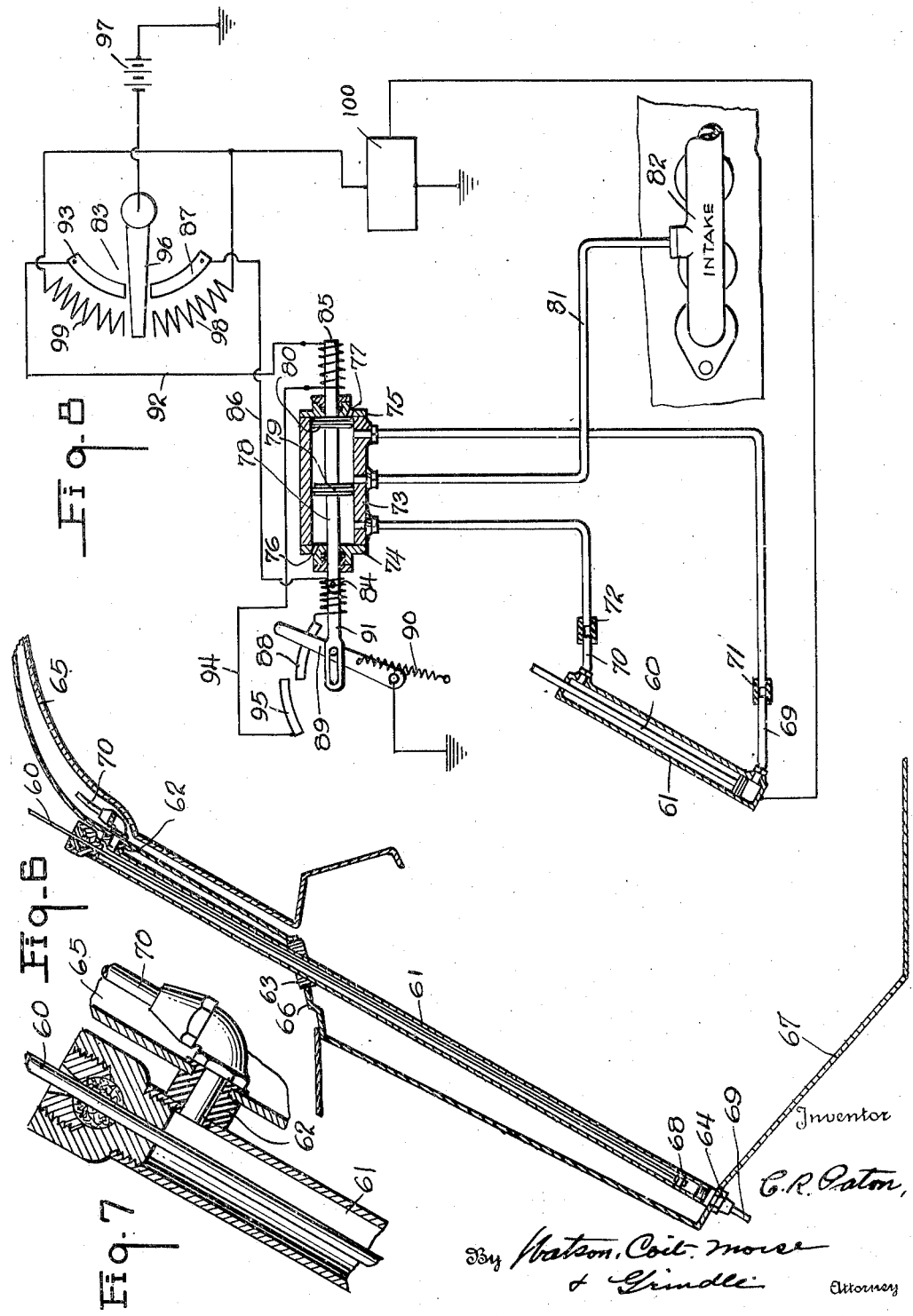

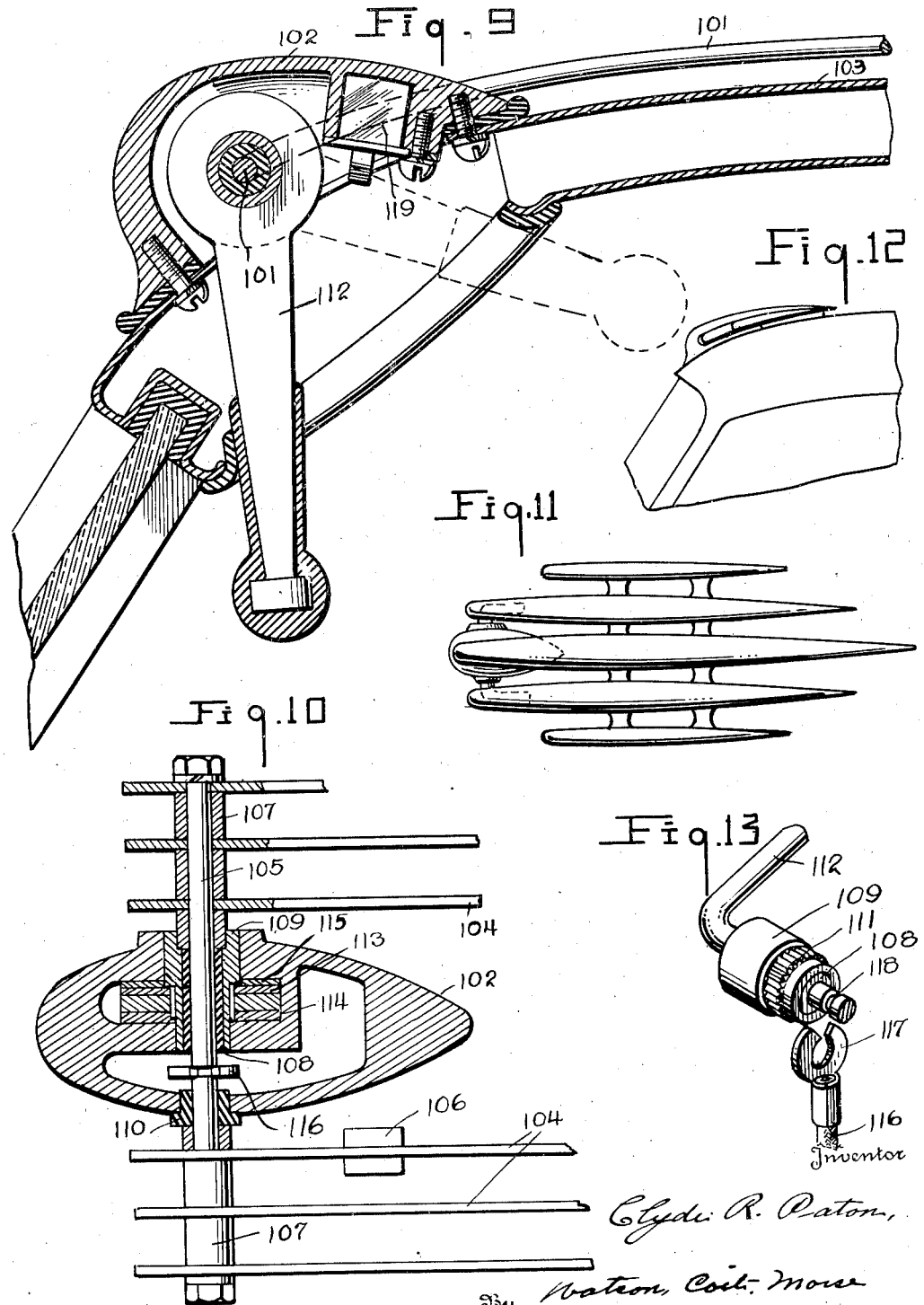

Feb. 25, 1941.  C. R. PATON  2,233,222
MOTOR VEHICLE ANTENNA
Filed Nov. 23, 1936  4 Sheets-Sheet 4
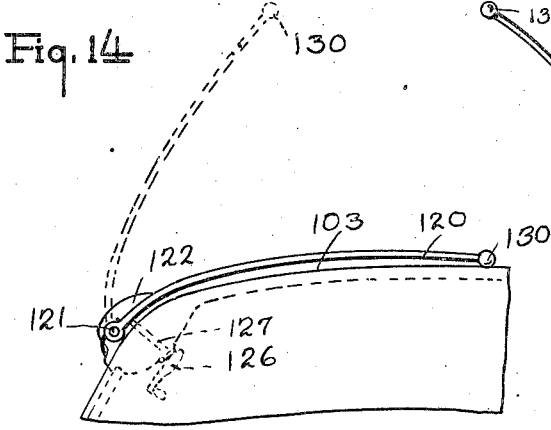
Fig. 14
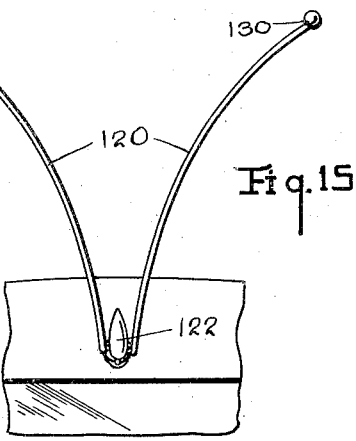
Fig. 15
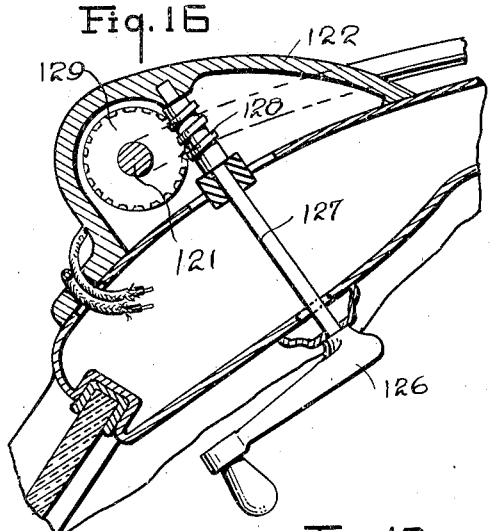
Fig. 16
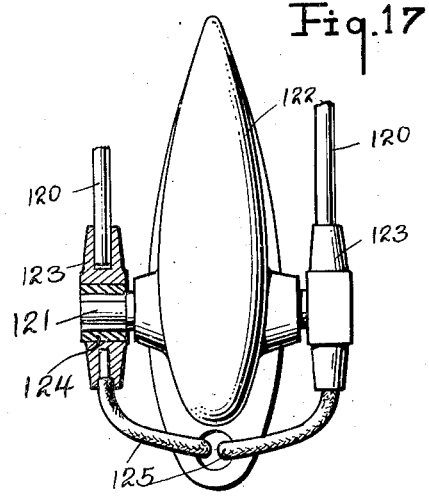
Fig. 17
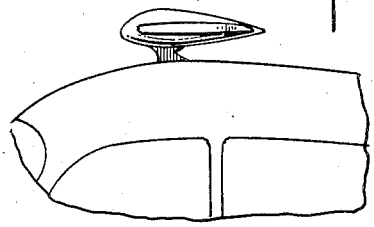
Fig. 18
Fig. 20
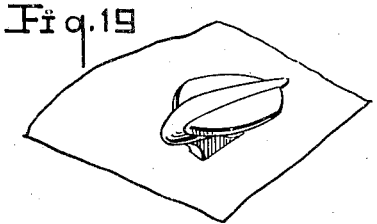
Fig. 19
Fig. 21
Inventor
C. R. Paton,
By Watson, Coit, Morse & Grindle
Attorney Patented Feb. 25, 1941

2,233,222

UNITED STATES PATENT OFFICE 2,233,222

MOTOR VEHICLE ANTENNA

Clyde R. Paton, Birmingham, Mich., assignor to Packard Motor Car Company, Detroit, Mich., a corporation of Michigan Application November 23, 1936, Serial No. 112,416

10 Claims. (Cl. 250—33)

The present invention relates to radio apparatus for use in connection with motor vehicles, and particularly to antenna for association with the top of a vehicle of the closed type.

With the advent of all steel vehicle tops, the location of radio antenna has become a serious problem, since the antenna cannot be built into the top structure, or located therebeneath, because of the shielding effect of the all steel top. Antennas have been placed below the running boards and at other points beneath the vehicle, but it has been found that the location of the antenna close to the ground is disadvantageous, in that the antenna collects static electricity generated in the tires, resulting in noisy reception and for other reasons.

Other attempts have been made, such as employing an insulated rear compartment door, or an insulated windshield column, as an antenna, but it has been found that the most satisfactory disposition of the antenna is to locate it as far as possible from the ground and from the vehicle body.

The whip type of antenna, comprising a short rod or strip of metal supported at one end, gives satisfactory results, but is unsightly and is also subject to damage when the vehicle is driven under low overhead structures.

The present invention has for an object the provision of an antenna in association with the top of a vehicle in such a manner as to reduce its unsightliness and minimize the danger of injury to the antenna. A further object is the provision of a whip type antenna in combination with means for elevating it into a position above the vehicle top, for optimum reception, and lowering it to an inconspicuous position when not in use.

A further object is the provision of antenna means adapted to cause a minimum of wind resistance while the vehicle is in motion. Another object is the provision of an antenna associated with the top of a vehicle, and means operable from within the vehicle for raising and lowering the antenna. A still further object is the provision of automatic means, responsive to the radio receive control switch, for raising and lowering the antenna. Another object is the provision of means operable by engine vacuum to raise and lower the antenna.

Other and further objects, features and advantages will appear from the description which follows, together with the accompanying drawings, in which:

Figure 1 is a side elevation of a retractible antenna according to the present invention, as applied to a motor vehicle;

Figure 2 is a detail of the operating mechanism of Figure 1;

Figure 3 is a section on line 3—3 of Figure 2;

Figure 4 is a vertical section through the top of the windshield column of Figure 1;

Figure 5 is a vertical section through a modified form of antenna and operating mechanism;

Figure 6 is a vertical section through another form of operating mechanism, as applied to a vehicle;

Figure 7 is a detail of the upper end of the mechanism of Figure 6;

Figure 8 is a diagrammatic view of the operating mechanism for the antenna of Figure 6;

Figure 9 is a vertical section through a further form of antenna and operating mechanism;

Figure 10 is a horizontal section through the mechanism of Figure 9, showing a slightly different form of antenna;

Figure 11 is a plan view of a modified form of antenna adapted for association with the mechanism of Figures 9 and 10;

Figure 12 is a side elevation of the antenna of Figure 11;

Figure 13 is a detail showing a portion of the mechanism of Figures 9 and 10;

Figure 14 is a side elevation of another form of antenna and operating mechanism;

Figure 15 is a front elevation of the device of Figure 14;

Figure 16 is a vertical section through the operating mechanism of Figure 14;

Figure 17 is an enlarged fragmentary plan, partly in section, of the device of Figure 15;

Figures 18 and 19 are a side elevation and a perspective, respectively, of another form of antenna; and Figures 20 and 21 are, respectively, a side elevation and a perspective of a still further form of antenna.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to the drawings, and particularly to Figure 1, the numeral 10 designates, generally, a portion of a motor vehicle comprising a cowl 11, dash 12, toe board 13, instrument board 14, central windshield column 15 and top member 16. With the exception of the windshield column 15, these various members are conventional in form and organization. A radio receiver 17 is secured behind the dash and beneath the instrument board in the usual manner.

The windshield column 15 extends upwardly from the cowl to the top in the usual manner, but is hollow, and preferably of substantially cylindrical cross-section, so as to form an elongated cylindrical chamber open at top and bottom. A tubular liner 18 of insulating material, is disposed within the windshield column 15, and a similar tube 19 of insulating material is disposed below the windshield column 15 and extends downwardly through the toe board 13, terminating approximately at the level of the vehicle frame 20. The tube 19 is protected by a metallic sheath 21, which is grounded to the frame as at 22. A bracket 23 is secured to but insulated from the underside of the cowl 11 in any suitable manner, and serves to support the tube 19 and the antenna operating mechanism to be described.

An antenna 24, of any suitable metal and of a length approximating the total distance from the bottom of tube 19 to the top of the vehicle, is slidably mounted within the tubes 18 and 19, the upper end of the windshield column 15 and tube 18 being closed by a gland 25 to prevent the entrance of moisture. The lower end of the antenna 24 is provided with a stop member 26. A collar 27, of conducting material, is supported upon the lower end of the bracket 23 by means of a clamp 28, likewise of conducting material. The collar 27 embraces the antenna 24 with a sliding fit, serving to maintain the latter in alignment and cooperating with the stop member 26 to prevent withdrawal of the antenna from the tube 19. The collar also acts as a conducting means for the antenna currents, between the antenna and a conductor 29 which is secured at one end to the bracket 23 and at its other end to the antenna contact of the receiver 17.

The antenna may be raised and lowered by means of a roller 30, carried by a shaft 31 journalled in the bracket 23 and instrument board 14, but insulated from the latter, a crank 32 being secured on the rearward end of the shaft 31 for rotating roller 30. The latter is preferably faced with rubber to insure adequate frictional engagement between the antenna and roller. The antenna is urged into engagement with the roller 30 by a spring-loaded roller 33, supported from the bracket 23, the roller 33 and associated members serving as a second path for antenna currents between the antenna and the conductor 29.

It is believed that the mode of operation of the device will be readily apparent from the foregoing description. When it is desired to use the radio receiver, the antenna may be elevated by turning the crank 32 in the proper direction. When the radio receiver is not in use, or when a low overhead structure endangers the antenna, the latter may be lowered by a reverse movement of the crank.

In the form illustrated in Figure 5, the antenna 40 is in the form of a flat strip, and the windshield column and insulating liner are modified accordingly. In this case lower tube 19 and associated elements are omitted, and the antenna 40 is adapted to be retracted by coiling it upon a roller 41, rotatably mounted upon a shaft 42 supported in a casing 43. The lower end of the antenna 40 is secured in a slot 44 in the periphery of the roller 41, and the antenna is provided with spaced apertures 45 for engagement with a sprocket wheel 46. The latter is rotatably mounted on a shaft 47, carried by the casing 43, and is adapted to be rotated by a gear wheel 48 mounted upon the inner end of a shaft 49 journalled in an integral extension 50 of the casing 43. A crank 51 is secured upon the rearward end of shaft 49, and it is obvious that the antenna 40 may be coiled or uncoiled to lower or raise it, by an appropriate movement of the crank 51. The casing 43 and associated mechanism may be supported from the instrument board in any suitable manner, and should be insulated from all metal parts of the vehicle. A conductor, not shown, connects the casing 43 and the antenna contact of the radio receiver.

In the device illustrated in Figures 6, 7, and 8, the antenna 60, which may be of cylindrical cross-section as in the case of the antenna 24 of Figures 1–4, is adapted to be automatically raised when the radio receiver control switch is moved for the purpose of energizing the radio. In this case, the antenna 60 is slidably disposed in an elongated cylinder 61, which is supported by insulating mountings 62, 63 and 64 carried by the top 65, cowl 66 and toe board 67, respectively. The lower end of the antenna 60 is provided with a disc 68 constituting a piston head, and the respective ends of the cylinder 61 are connected by conduits 69, 70 with the respective ends of a valve 71 (Figure 8). The conduits 69, 70 are provided with insulating sections 71, 72, respectively.

The valve 71 comprises a cylinder 73 closed at its respective ends by heads 74 and 75, which are provided with air vents 76 and 77, respectively. A shaft 78 is slidably mounted in bearings formed in the heads 74 and 75, and is provided with spaced annular flanges 79 and 80 which are faced with leather or other suitable material so as to make air-tight engagement with the wall of cylinder 73, forming an air-tight chamber therein. A port disposed intermediate the ends of the valve 71 is connected by a conduit 81 with the intake manifold 82 of the vehicle engine, thus subjecting the valve to the engine vacuum. It will be obvious that when the shaft 78 is in the position illustrated, the lower end of cylinder 61 is subjected to the engine vacuum and its upper end is vented to the atmosphere through the conduit 70 and vent 76. The disc 68 will therefore be forced toward the lower end of cylinder 61, retracting the antenna 60. When the shaft 78 is moved to the left, so as to place conduits 70 and 81 in communication, the upper end of cylinder 61 is subjected to the engine vacuum, the lower end being open to the atmosphere through conduit 69 and vent 77, and the antenna 60 will be elevated.

Movement of the shaft 78 is controlled from the radio control switch 83. It will be noted that the projecting ends of the shaft 78 are surrounded by coils, thus forming solenoids 84 and 85. The former is adapted to be connected by a conductor 86 with a contact member 87 associated with the switch 83, and to be grounded on the frame through a contact member 88 and switch arm 89. The latter is tensioned by a spring 90, and is adapted to be moved to and from its opposite positions in accordance with the movements of the valve shaft 78, with which it is connected by a link 91.

The solenoid 85 is connected by a conductor 92 with a contact member 93 associated with the switch 83, and is adapted to be connected to ground through a conductor 94, contact member 95, and switch arm 89.

The switch arm 96 of switch 83 is connected with a suitable source of electric energy, for example, a battery 97, which is also grounded on the frame. With the parts in the positions illustrated, if the switch arm 96 of switch 83 is placed in contact with the contact member 87, the solenoid 84 will be energized, moving shaft 78 to the left, thus placing the conduits 70 and 81 in communication and elevating the antenna 60. At the same time, the switch arm 89 will be moved to the left by the link 91, being snapped over to its left position, as it arrives at its central position, by reason of the tension of spring 90. As soon as switch arm 89 leaves the contact member 88, the solenoid 84 is de-energized, thus avoiding waste of electric energy. Now, if the switch arm 96 is placed in contact with contact member 93, the solenoid 85 will be energized and valve shaft 78 will be moved to the right, placing the parts again in the position illustrated, and breaking the circuit through the solenoid 85.

The switch 83 comprises, in addition to the parts previously described, volume-control resistances 98 and 99, each of which is connected to the radio receiver 100, and each of which is adapted to be connected in circuit with the battery 97 by contact with the switch arm 96. The resistance 98 is of higher value than resistance 99 and may be said to comprise the "city" side of the volume control switch. The resistance 99 of lower value may be called the "country" side of the volume control. Either resistance may, of course, be varied by movement of the switch arm 96. The terms "city" and "country" are used solely for the purpose of designating conditions of reception requiring less or more power input respectively, and, normally, correspondingly decreased or increased antenna.

From the foregoing it will be apparent that when the receiver is placed in operation by moving the switch arm to the "city" side, the antenna 60, if extended, will be retracted, or if already retracted, will remain so. If the switch arm is moved to the "country" side, the power input to the receiver is increased and the antenna elevated, thereby improving reception. Obviously, the power input need not correspond to the antenna position, and if desired the resistances 98 and 99 may be of equal value, or any other suitable arrangement may be adopted. When the antenna is elevated, and it is desired to discontinue operation of the radio receiver, the antenna may be retracted by moving the switch arm 96 momentarily to the "city" side before placing it in its central position.

Another form of antenna and operating mechanism is illustrated in Figures 9–13. In this case the antenna comprises a system of one or more bars mounted on a shaft 101 journalled in a casing 102. The casing is preferably of airfoil design and is secured directly to the top 103 of the vehicle, the latter being apertured to accommodate the downwardly projecting parts of the mechanism. In the form illustrated in Figure 9, the antenna 101 consists of a single wire rod, while in Figures 10–12 two other forms are illustrated, the antenna of Figures 11 and 12 being particularly adapted and designed to diminish wind resistance. In the device of Figure 9, the forward end of the antenna is bent transversely to form its own shaft, while in the form illustrated in Figure 10, the antenna comprises a series of bars 104 secured on a shaft 105 and separated by spacers 107. One of the bars 104 may be provided with a rubber bumper 106 to prevent the grounding of the antenna upon the top of the vehicle.

The shaft 105 is bonded to a sleeve 108 of soft rubber, which is in turn bonded to an outer sleeve 109, journalled in casing 102. At the opposite side of the casing, the shaft 105 is journalled in a rubber bushing 110. A portion of the periphery of the sleeve 109 is serrated, as at 111 (Figure 13), for engagement with a correspondingly shaped aperture in the upper end of the operating lever 112. The lever is thus mounted on the sleeve and serves to elevate and depress the antenna 101 in accordance with its movements. Friction discs 113 and 114 are mounted on sleeve 109 on either side of the lever 112, and a spring washer 115 is disposed between the friction disc 113 and the wall of the casing 102, the discs 113, 114 and washer 115 cooperating to retain the lever 112 in any position in which it is placed.

A conductor 116 (Figure 13) for connecting the antenna and receiver is connected to the shaft 105 by means of a spring clip 117, which engages in a groove 118 formed in the shaft 105.

If desired, a sensitivity switch 119 (Figure 9) may be associated with the casing 102 in such a way as to be operated by movement of the lever 112 into and out of its uppermost position, thus providing for adjusting the sensitivity of the receiver in accordance with the position of the antenna.

In the device illustrated in Figures 14–17 the antenna comprises two wire rods 120 seated in discs 123, mounted on a shaft 121, which is journalled in a casing 122. The discs 123 are insulated from shaft 121 by rubber bushings 124, and are connected to the radio receiver by conductors 125. The shaft 121 is adapted to be rotated, to elevate and depress the antenna, by means of a crank 126, secured to a shaft 127, journalled in the casing 122. A worm 128 secured on the shaft 127 engages a worm gear 129 on shaft 121, and it is apparent that the antenna may be elevated or depressed by rotating the crank 126 in the proper direction. Preferably the rearward ends of rods 120 are provided with soft rubber knobs 130, to prevent the rods from grounding on the vehicle top.

Figures 12–21 show two exemplary forms of antenna designed to reduce wind resistance while providing relatively large surfaces for the interception of radio energy. These forms of antenna are illustrated as rigidly attached to the vehicle top, although it is obvious that similar forms might be mounted for relative movement therewith.

Having thus described the invention, what is claimed as new and desired to be secured by Letters Patent is:

1. In radio apparatus for motor vehicles having a top and a windshield, supporting means for said windshield including a hollow column, an antenna retractable within said column and adapted to be raised above said top, and means for raising and lowering said antenna.

2. An antenna system including a high frequency transmission line having at least one tubular conductor, an antenna element projecting from said tubular conductor, said element being sufficiently rigid to be self supporting and free at its outer end and arranged to slide in said conductor in a fluid tight manner and means for applying fluid pressure to said tubular conductor whereby the effective length of said antenna element may be adjusted to selected values.

3. In an antenna system for motor vehicles, the combination with a tubular housing for mounting on a vehicle body, of an antenna element projecting from said housing, said element being sufficiently rigid to be self-supporting and free at its outer end, and being arranged to slide in said housing in a fluid tight manner, and means for applying fluid pressure to said tubular housing to extend said antenna element from or withdraw said antenna element into said housing.

4. In an antenna system for motor vehicles, the combination with a tubular housing for mounting on a vehicle body, of an antenna element projecting from said housing, said element being sufficiently rigid to be self-supporting and free at its outer end, and being arranged to slide in said housing in a fluid tight manner, means for applying fluid pressure to said tubular housing to extend said antenna element from or withdraw said antenna element into said housing, and means mounting said housing on the vehicle cowl in such a position that the major portion of said housing lies within the vehicle body while the major portion of said antenna element may be projected beyond said cowl and may extend to a point above the vehicle top.

5. In an antenna system for motor vehicles, the combination with a support, of an antenna element carried by said support, said element being sufficiently rigid to be self-supporting and free at its outer end, and being arranged for lengthwise sliding movement in said support, means mounting said support on the vehicle cowl in such a position that said antenna element may be displaced in said support from an extended position in which it reaches above the vehicle top to a withdrawn position in which it lies largely within the vehicle body, and operating means within the vehicle body for so displacing said antenna element with respect to its support.

6. In an antenna system for motor vehicles, the combination with a support, of an antenna element carried by said support, said element being sufficiently rigid to be self-supporting and free at its outer end, means mounting said support on the vehicle cowl in such a position that said antenna element may be displaced in said support from an extended position in which it reaches above the vehicle top to a withdrawn position in which it lies largely within the vehicle body, and operating means within the vehicle body for so displacing said antenna element with respect to its support.

7. In an antenna system for motor vehicles, the combination with an elongated, generally upright antenna element extending from the interior to the exterior of the passenger compartment of the vehicle, an insulating tubular member surrounding said element adjacent the point of emergence thereof, an insulating tubular member surrounding a lower portion of said element, said members supporting said element for extension from and retraction into the passenger compartment and being disposed in spaced relation to expose a section of said element therebetween for manipulation.

8. In an antenna system for motor vehicles, the combination with an elongated, generally upright antenna element extending from the interior to the exterior of the passenger compartment of the vehicle, an insulating tubular member surrounding said element adjacent the point of emergence thereof, an insulating tubular member surrounding a lower portion of said element, said members supporting said element for extension from and retraction into the passenger compartment and being disposed in spaced relation to expose a section of said element therebetween for manipulation, and operating means engaging the exposed section of said element, said operating means comprising a friction roller, and means for maintaining said antenna in frictional engagement with said roller.

9. In an antenna system for motor vehicles, the combination with a support, of an antenna element carried by said support, said element being sufficiently rigid to be self-supporting and free at its outer end, means mounting said support on the vehicle body in such a position that said antenna element may be displaced in said support from an extended position in which it reaches above the vehicle top to a withdrawn position in which it lies largely within the vehicle body, and operating means within the vehicle body for so displacing said antenna element with respect to its support, said last named means comprising a crank operated roller and means for maintaining said antenna element in frictional engagement with said roller.

10. In an antenna system for motor vehicles, the combination with a support, of an antenna element carried by said support, said element being sufficiently rigid to be self-supporting and free at its outer end, but being sufficiently flexible to permit coiling thereof, means mounting said support on the vehicle body in such a position that said antenna element may be displaced in said support from an extended position in which it reaches above the vehicle top to a withdrawn position in which it lies largely within the vehicle body, said support comprising a casing adapted to receive a portion of said element, and operating means for coiling said portion of said element within said casing to effect withdrawal of said element.

CLYDE R. PATON.